United States Patent [19]
Gough

[11] Patent Number: 4,750,606
[45] Date of Patent: Jun. 14, 1988

[54] BUCKET TIPPING APPARATUS WITH INCREASED DWELL TIME FOR BUCKET IN INVERTED POSITION

[76] Inventor: George T. Gough, 5710 Caboose Ct., Charlotte, N.C. 28282

[21] Appl. No.: 60,501

[22] Filed: Jun. 11, 1987

[51] Int. Cl.[4] .............................................. B65G 47/40
[52] U.S. Cl. .................................................. 198/706
[58] Field of Search ............... 198/706, 713, 703, 705; 414/570; 37/DIG. 2

[56] References Cited

U.S. PATENT DOCUMENTS

| 1,459,253 | 6/1923 | Plummer | 198/706 X |
| 1,583,450 | 5/1926 | Frederick et al. | 198/706 |
| 2,107,890 | 2/1938 | Frank | 198/706 X |

FOREIGN PATENT DOCUMENTS

| 2546748 | 4/1977 | Fed. Rep. of Germany | 198/706 |
| 2164310 | 3/1986 | United Kingdom | 198/706 |

*Primary Examiner*—Robert J. Spar
*Assistant Examiner*—Lyle A. Kimms
*Attorney, Agent, or Firm*—W. Thad Adams, III

[57] ABSTRACT

An apparatus for tipping a bucket carried by a conveyor chain around a circuit to empty the contents thereof at a predetermined location. The apparatus is characterized by providing a dwell time to the bucket in its inverted position as the bucket is rotated 360 degrees around a fixed pivot degrees to permit complete emptying of the buckets. The apparatus comprises a sprocket mounted concentric with the pivot about which the bucket rotates and fixed for rotation with the bucket. The sprocket has a plurality of radially outwardly-extending uniformly spaced-apart projections and at least one space on the sprocket defined by the absence of a projection. An elongate rack is positioned adjacent the chain at the bucket tipping position and has sprocket engaging portions thereon positioned in engaging alignment with the projections of the sprocket as the bucket passes, thereby to arrest rotation of the bucket while the bucket is in its inverted position to permit the contents to empty entirely.

5 Claims, 13 Drawing Sheets

FIG. 18

BUCKET TIPPING APPARATUS WITH INCREASED DWELL TIME FOR BUCKET IN INVERTED POSITION

TECHNICAL FIELD AND BACKGROUND OF THE INVENTION

This application relates to Ser. Nos. 060,604, 060,478 and 060,455 which are co-pending herewith.

This invention relates to an apparatus for tipping a bucket carried by a conveyor chain around a circuit to empty the contents at a predetermined location. The apparatus is characterized by providing a dwell time to the bucket in its inverted position as the bucket is rotated 360 degrees around a fixed pivot degrees to permit complete emptying of buckets.

The most effective way of dumping contents from a moving bucket is to move the bucket through a complete 360 degree revolution. The speed at which the bucket is inverted is directly proportional to the speed of the chain. For this reason, high speed conveyors rotate the bucket through a 360 degree revolution so fast that products having a relatively light density, for example, food and chemical products of less than 30 pounds per cubic foot may not be completely emptied from the bucket. The bucket is rotated so fast that the trailing edge of the bucket acts as a scoop and retrieves some of the contents before they fall free.

In accordance with the invention described below, this problem can be eliminated by increasing the dwell time of the bucket in the inverted position. This permits the contents to completely empty from the bucket before the continued rotation returns the bucket to its upright position.

SUMMARY OF THE INVENTION

Therefore, it is an object of the invention to provide an apparatus for tipping a bucket in such a manner as to insure that the contents are completely emptied.

It is another object of the invention to provide an apparatus for tipping a bucket which permits the bucket to stay in an inverted position momentarily while continuing to move along the circuit of the conveyor in order to empty all of the contents from the bucket.

According to one preferred embodiment of the invention, an apparatus is provided for tipping a bucket carried by a conveyor chain around a circuit to empty the contents at a predetermined location. The apparatus is characterized by providing a dwell time to the bucket in its inverted position as the bucket is rotated 360 degrees around a fixed pivot to permit complete emptying of the buckets. The apparatus comprises a sprocket mounted concentric with the pivot about which the bucket rotates and is fixed for rotation with the bucket. The sprocket has a plurality of radially outwardly-extending uniformly spaced-apart projections and at least one space on said sprocket defined by the absence of a projection. An elongate rack is positioned adjacent the chain at the bucket tipping position and has a sprocket engaging means positioned in engaging alignment with the projections of the sprocket as the bucket passes thereby to arrest rotation of the bucket while the bucket is in its inverted position to permit the contents to empty entirely.

According to another preferred embodiment of the invention, the sprocket has five projections spaced 60 degrees of arc apart. The space on said sprocket defined by the absence of a projection comprises 120 degrees of arc.

According to yet another embodiment of the invention, the sprocket engaging means comprise pins projecting outwardly from the rack into the path of travel of the sprocket, and a dwell space thereon between two of the pins in registration with the space on the sprocket defined by the absence of a projection.

According to one preferred embodiment of the invention, an arresting block is positioned in the dwell space on said rack for preventing rotation of the sprocket and the bucket.

According to one preferred embodiment of the invention, the apparatus comprises a sprocket mounted concentric with the pivot about which the bucket rotates and fixed for rotation with the bucket. The sprocket has five projections thereon spaced 60 degrees of arc apart. The space on said sprocket defined by the absence of a projection comprises 120 degrees of arc. An elongate rack is positioned adjacent the chain at the bucket tipping position and has sprocket engaging means thereon positioned in engaging alignment with the projections of the sprocket as the bucket passes thereby. The sprocket engaging means comprises pins projecting outwardly from the rack into the path of travel of the sprocket, and a dwell space thereon between two of the pins in registration with the space on the sprocket defined by the absence of a projection, and includes means for cooperating with the space on the sprocket defined by the absence of the projection to arrest the rotation of the bucket while the bucket is in its inverted position to permit the contents to empty entirely.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
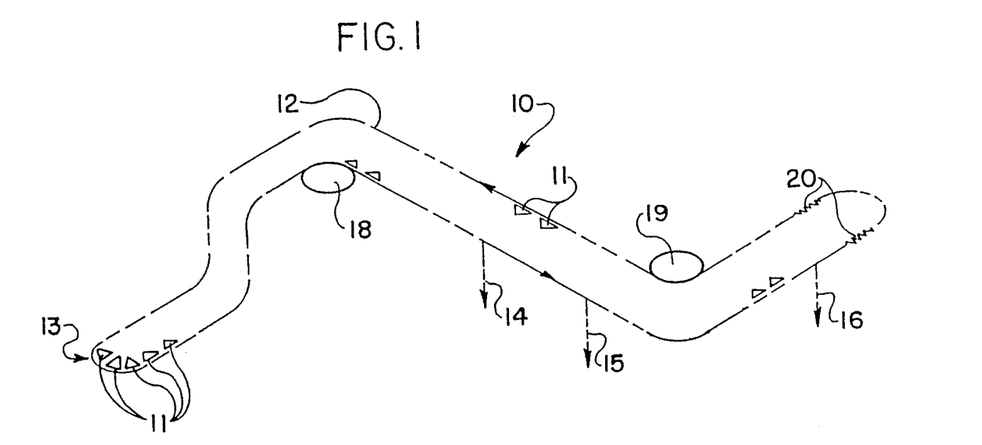
FIG. 1 is a schematic perspective view of a conveyor circuit showing a drive arrangement according to the prior art.

Referring now specifically to the drawings, a conveyor circuit according to the prior art is illustrated in FIG. 1 and indicated broadly at reference numeral 10. As is shown, a plurality of spaced-apart, wedge-shaped buckets 11 are mounted on the inside of a chain 12 which moves around a circuit from a location 13 where the buckets are filled to locations 14, 15 and 16 where the buckets can be selectively emptied by dumping or tipping, as desired. Of course, any desired number of filling and emptying locations can be provided, as is necessary.

The basic features shown in FIG. 1 are the subject of British Pat. Nos. 2,164,310A and 1,139,490, owned by this applicant and disclose the basic concept of providing wedge-shaped buckets which, when presented into a specifically designed radius such as the filling station 13 bring the buckets, which are normally free to rotate about a horizontal axis perpendicular to the direction of travel, into juxtaposition with each other with overlapping lips to enable them to be filled without spillage. After filling, the buckets separate to enable them to negotiate the curves and angles of the circuit without colliding with each other.

As is evident from FIG. 1, the buckets 11 must be on the inside of the chain 12 in order to be moved into juxtaposition with each other at the filling location 13. Therefore, sprocket drives 18 and 19 must be positioned on the outside of the chain to avoid interference with the buckets. A tension unit 20 keeps the chain at the proper tension for given load and chain speed conditions.

Figures 2, 3:
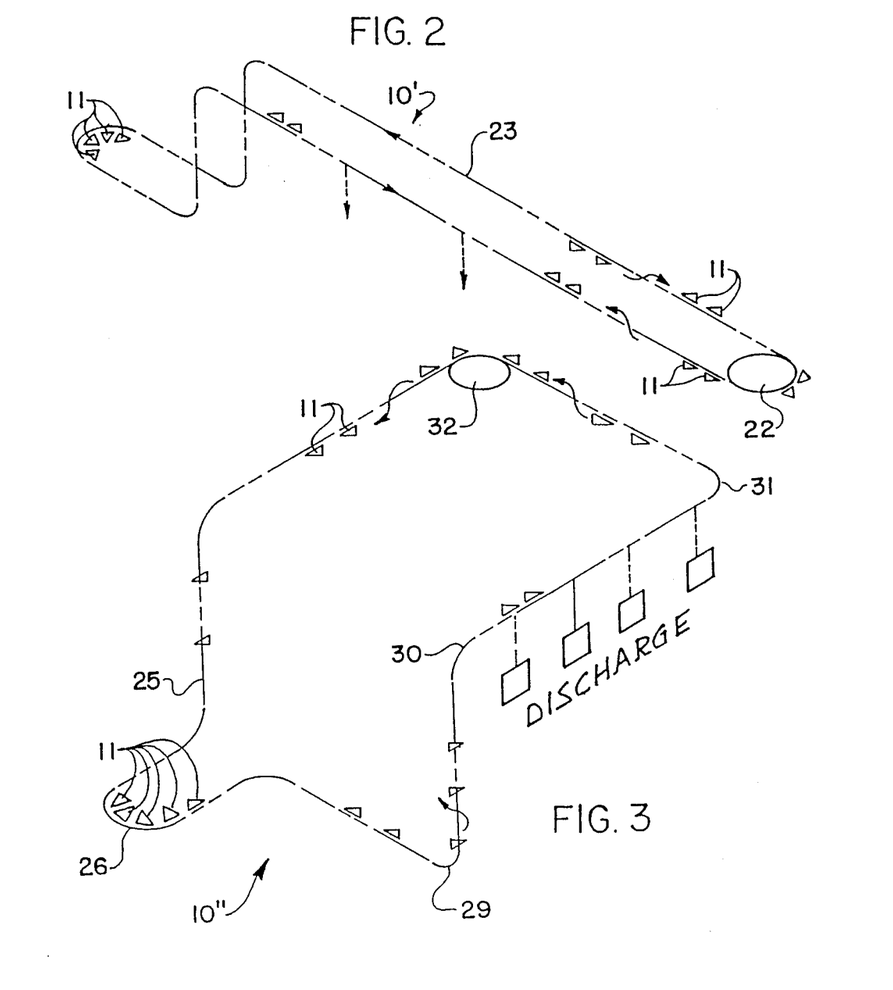
FIG. 2 is a schematic perspective view of a conveyor circuit showing bucket rotation before and after passage past a drive tension sprocket.
FIG. 3 is a schematic perspective view of another conveyor circuit showing bucket rotation of 90 and 180 degrees at different points in the circuit.

As is shown in FIG. 2 in a conveyor circuit 10', a more efficient drive tension sprocket 22 operating on the inside of a chain 23 can be used by moving the buckets 11 to the outside of the chain when passage of the buckets past the drive tension sprocket 22 occurs, and then moving the buckets back to the inside of the chain so that they are in the required inside position during passage at the filling location 13.

Another variation is shown in FIG. 3 in a conveyor circuit 10", where the buckets 11 are conveyed around a circuit which includes a chain 25 having both horizontal and vertical right angle bends. For example, on chain 25 material is loaded into the buckets 11 at a filling location 26. The buckets then travel counterclockwise around a horizontal right angle bend 28 in the usual manner. However, when the buckets reach the vertical right angle bend 29, they must be rotated 90 degrees in order for them to remain upright when they pass over the next right angle bend 30. The buckets negotiate the right angle bend 31 in the usual manner but must be rotated 180 degrees to the outside of the chain 25 before reaching the drive tension sprocket 32. Then after passage around drive tension sprocket 32, the buckets are rotated back to the inside of the chain 25 for movement back to the filling location 26.

Figure 4:
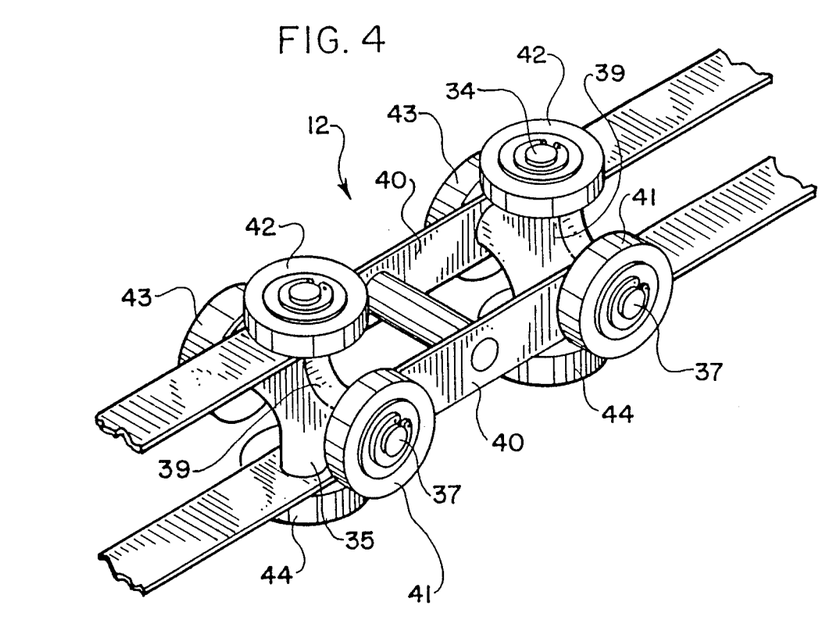
FIG. 4 is a fragmentary perspective view of a conveyor chain according to the prior art.

The mechanism for performing these functions is described below. First, however, brief reference is made to the chain 12 according to the prior art in FIG. 4. Chain 12, as is shown in FIG. 4, is biplanar and can only be moved through two fixed planes as the chain pivots around a vertical axis defined by vertically-extending shafts 34 and 35, and horizontaly-extending shafts 37 and 38 of a cruciform 39. Cruciforms 39 are connected together by chain members 40 and ride in a chain track formed of four spaced-apart tubes against which ride wheels 41, 42, 43 and 44.

Figure 5:
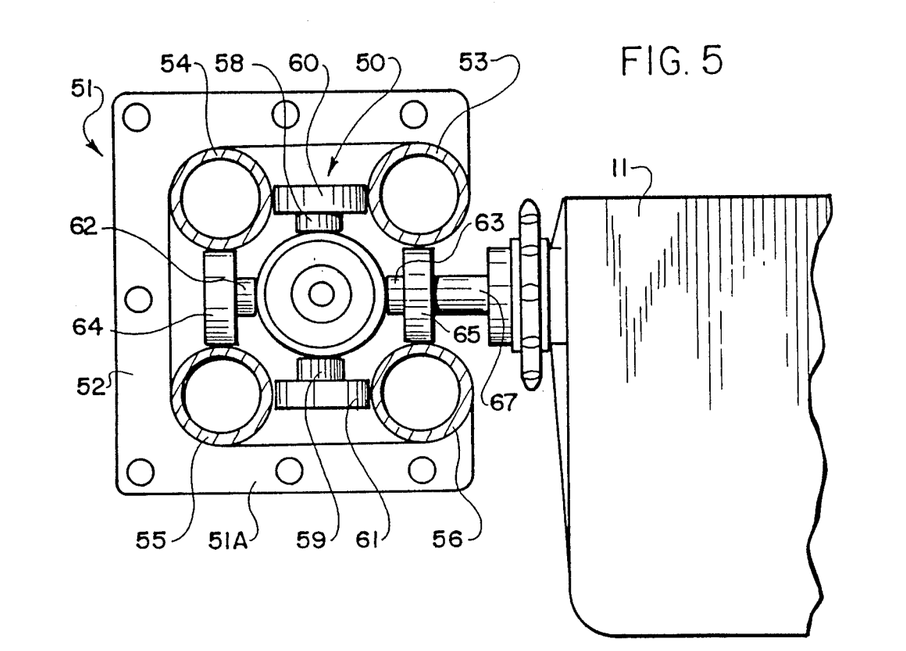
FIG. 5 is a vertical cross-sectional view of a chain, chain track and bucket trolley according to the present invention.

Referring now to FIG. 5, a bucket trolley 50 and chain track 51 according to an embodiment of the invention is shown. Chain track 51 comprises a track plate 52 closed on three sides and supporting four spaced-apart tubes 53, 54, 55 and 56. Bucket trolley 50 comprises vertical wheel shafts 58 and 59 with wheels 60 and 61, respectively, mounted for rotation thereon, and horizontal wheel shafts 62 and 63 with wheels 64 and 65, respectively mounted for rotation thereon. As is clearly shown in FIG. 5, wheels 60, 61, 64 and 65 ride between tubes 53, 54, 55 and 56 in such a manner as to maintain proper orientation of the trolley 50 with the chain track 51. The bucket 11 is supported on trolley 50 by means of a horizontally-extending spindle 67 on which the bucket is mounted for rotation. This rotation permits the bucket 11 to be tipped for emptying at the appropriate time.

Figure 6:
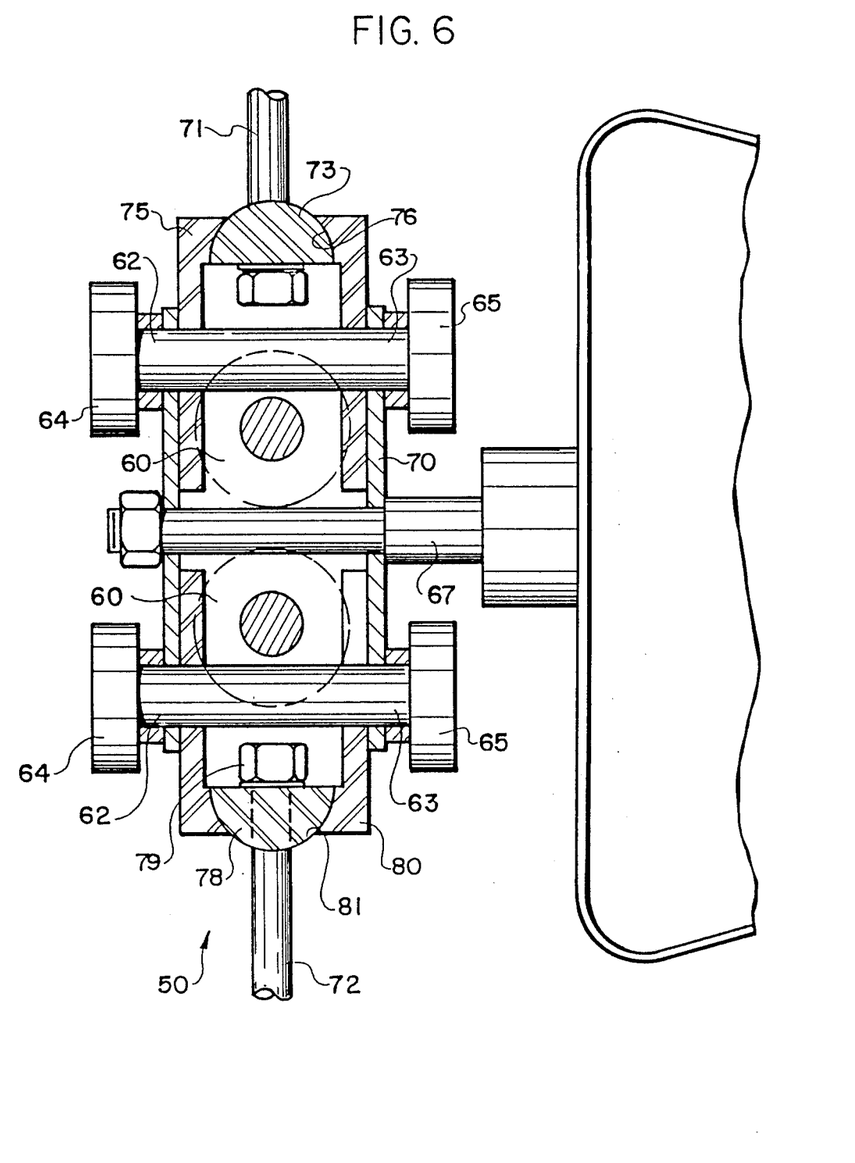
FIG. 6 is a top plan cross-sectional view of the apparatus shown in FIG. 5.

Further details of the trolley 50 are shown in FIG. 6. The wheel shafts 58, 59 62, and 63 and wheels 60, 61, 64 and 65 described above are carried on a chassis 70 on which is also mounted the spindle 67. Adjacent trolleys 50 are connected together by connecting rods 71 and 72. A semi-spherical end bush 73 is attached to one end of connecting rod 71 by means of nut 74 and is seated in a housing 75 having a spherical seat 76 formed on the inner wall thereof. A semi-spherical end bush 78 is attached to one end of connecting rod 72 by means of nut 79 and is seated in a housing 80 having a spherical seat 81 formed on the inner wall thereof. The trolley 50 is therefore able to rotate about an axis along the length of the chain track 51.

Figures 7, 8:
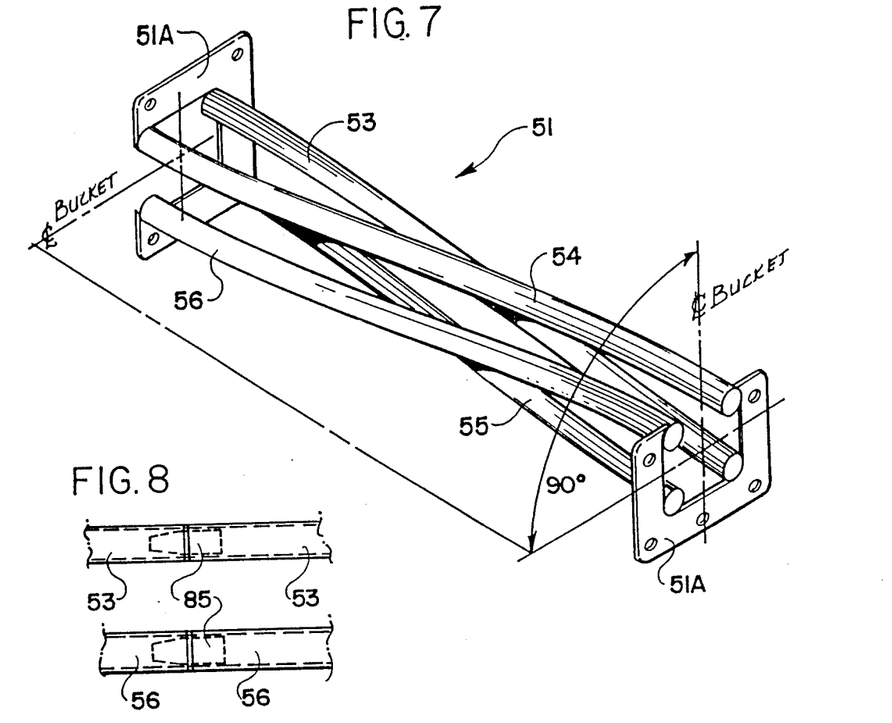
FIG. 7 is a perspective view of a length of chain track according to the present invention.
FIG. 8 is a cross-sectional view illustrating a way of joining together adjacent lengths of chain track shown in FIG. 7.

Referring now to FIG. 7, this is accomplished by forming the tubes 53, 54, 55 and 56 making up chain track 51 into parallel curves which over a predetermined distance have an axis of rotation of, for example, 90 degrees. In the section of chain track 51 shown in FIG. 7, the trolley 50 and the bucket carried on the trolley 50 will be rotated 90 degrees as the trolley moves from one end of the section of chain track 51 to the other. This movement is shown in the environment of the circuit 25 is FIG. 3 and occurs at vertical right angle bend 29.

To rotate trolley 50 and bucket 11 180 degrees before and after passage past the drive tension sprocket 32, two sections of the chain track 51 are connected together end-to-end by a flange 51a in each instance. In addition to connecting together the sections of chain track 51 by flanges 51a, plugs 85 are inserted into the adjacent open ends of the tubes 53, 54, 55, and 56. See FIG. 8.

Figure 9:
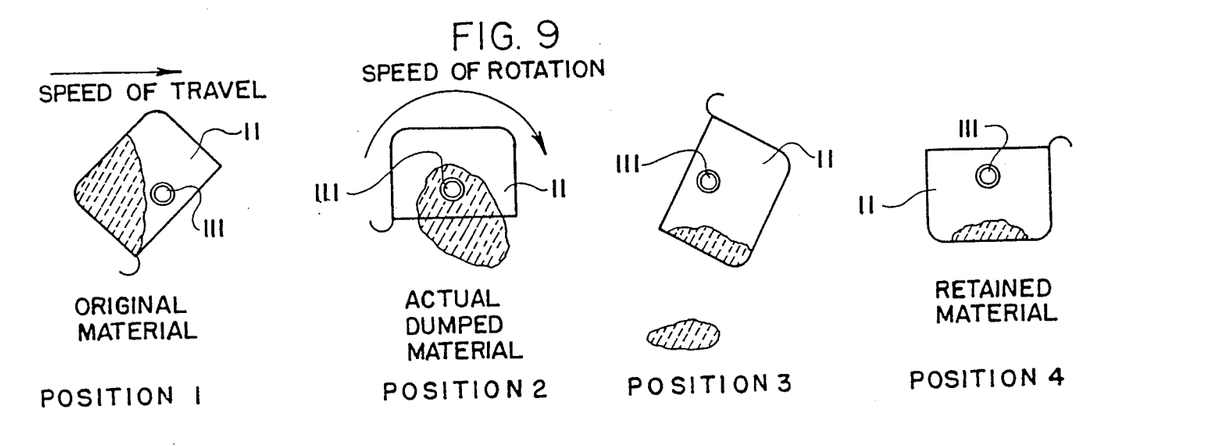
FIG. 9 is a sequence of views illustrating the prior art problem of material retainage when tipping buckets traveling at high speed.

The most effective way of dumping contents from a moving bucket is to move the bucket through a complete 360 degree revolution. The speed at which the bucket is inverted is directly proportional to the speed of the chain. For this reason, high speed conveyors rotate the bucket through a 360 degree revolution so fast that products having a relatively light density, for example, food and chemical products of less than 30 pounds per cubic food of density, are not completely emptied from the bucket. This is illustrated in FIG. 9. In position 1, the bucket has begun to invert and the contents are falling towards the mouth of the bucket. In position 2, the bucket is inverted and the contents are free falling out of the mouth of the bucket. However, the bucket is rotating so fast that the trailing edge of the bucket acts as a scoop and retrieves some of the contents before they fall free, as is shown in positions 3 and 4.

Figure 10:
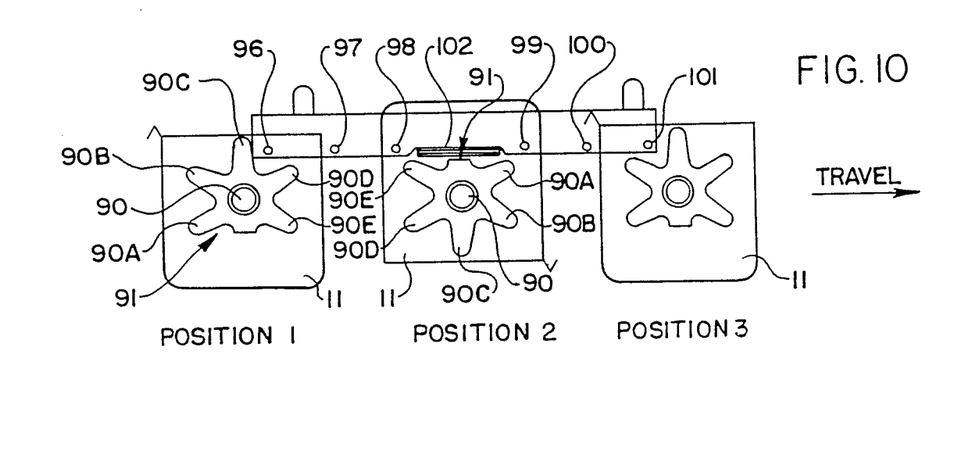
FIG. 10 is a sequence of views illustrating the use of a sprocket with a missing projection for increasing the dwell time of the bucket in its inverted position.

This problem can be eliminated by increasing the dwell time of the bucket in the inverted position. The means by which this is done is illustrated in FIG. 10. As is shown, bucket 11 includes a sprocket 90 mounted on and concentric with spindle 67 on which bucket 11 is mounted. The sprocket 90 is fixed on spindle 67 so that movement of sprocket 90 results in unison movement of bucket 11. In the embodiment shown in FIG. 10, sprocket 90 has five outwardly extending, tapered teeth 90a, 90b, 90c, 90d, and 90e, each 60 degrees apart, thereby forming a star-shaped structure. Of course, sprockets having other numbers and shapes of teeth can also be used as desired. A 120 degree space 91 is defined by the absence of the sixth tooth which would otherwise be present between teeth 90a and 90e. The spindle 76 is positioned sufficiently high so that the center of gravity of the bucket is well below the sprocket 90. Therefore, the weight of bucket 11 will cause the bucket 11 and sprocket 90 to normally assume the position shown in position 1 of FIG. 10.

A rack 95 is mounted adjacent chain track 51 at each position where emptying of the buckets 11 will take place. Usually, only one rack 95 is in position at any one time, and the rack 95 is mounted so that it can be easily put into and out of operation as is necessary to vary the emptying location. Rack 95 has a plurality of laterally outwardly-extending pins 96 through 101 inclusive. Pins 96-101 project into the path of travel of the sprocket 90. As the bucket 11 is carried from position 1 to position 3 in FIG. 10, pin 96 engages tooth 90c and the bucket 11 is tipped counterclockwise. Pin 97 engages tooth 90d and rotates the bucket 11 further. Pin 98 engages tooth 90e and pushes it counterclockwise as the bucket 11 continues to move. At position 2 in FIG. 10, the bucket is completely inverted and contents are free to empty. However, where space 91 is now adjacent rack 95, there is no pin and no tooth to be engaged by the pin. Therefore, bucket 11 does not rotate at the position shown in position 2, but is stationary long enough for the entire contents of the bucket 11 to empty. A nylon block 102 is positioned on the bottom of rack 95 between pins 98 and 99 and absorbs the impact of the sprocket 90 and arrests its rotation momentarily. A sufficient distance is left between sprocket 90 and block 102 to permit sprocket 90 to rotate enough in this area for pin 99 to catch tooth 90a and to continue bucket rotation back to its upright position, as is shown in position 3 of FIG. 10.

Figure 11:
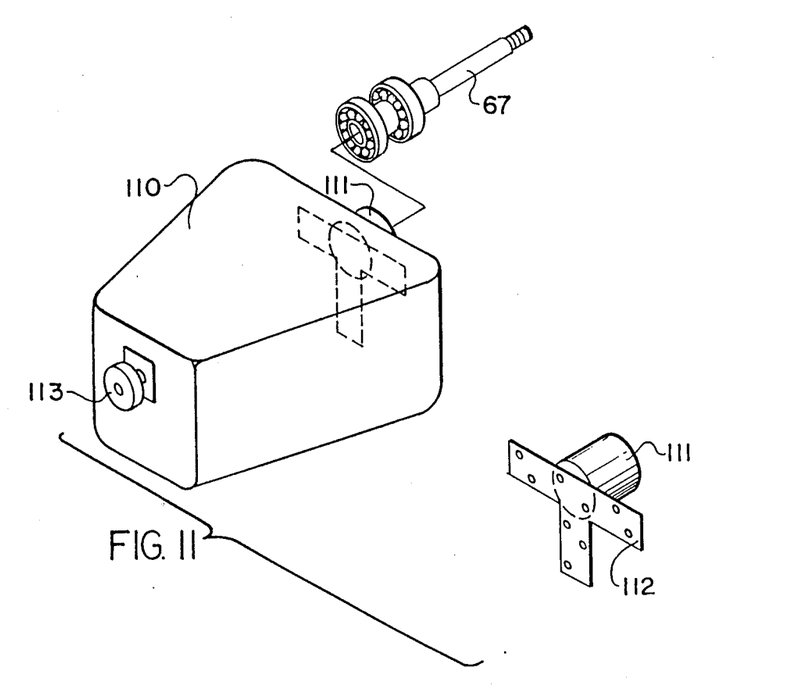
FIG. 11 is an exploded perspective view of a bucket according to the invention having auxiliary support.
Figure 12:
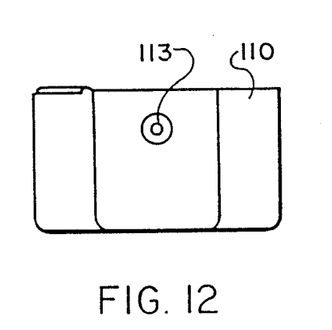
FIG. 12 is a side elevation view of the bucket shown in FIG. 11.

Details of the design of bucket 11 are shown in FIGS. 11-14. For relatively small buckets, it is sufficient to mount the bucket on one side only. This, of course, is the large side of the bucket adjacent the chain track 51. However, for relatively large buckets and buckets carrying very heavy loads, a bucket as is shown in FIG. 11 is used. Bucket 110 is constructed of a light weight plastic/nylon/polymer material which is also sanitary and easy to clean. A main bucket trunion 111 is welded to a steel support plate 112 which in turn is molded into the wall of bucket 110. Spindle 67 is then positioned in trunion 111.

Figure 13:
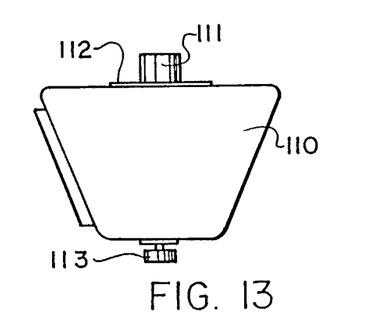
FIG. 13 is a top plan view of the bucket shown in FIG. 11.
Figure 14:
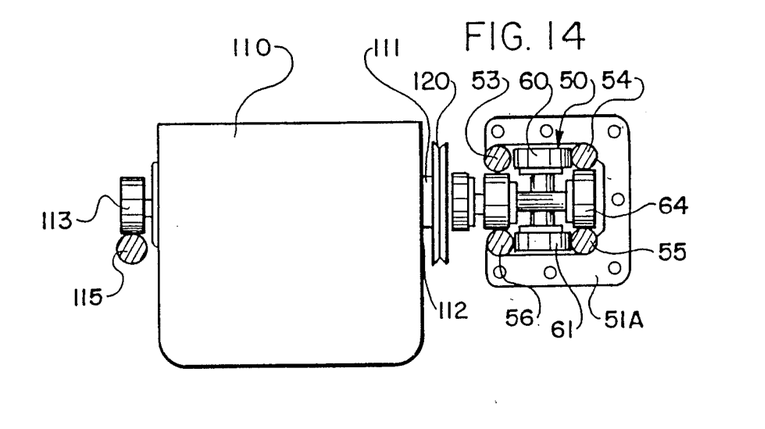
FIG. 14 is an elevation view, with the track in cross-section, of an embodiment of the invention having auxiliary support for the bucket, and rack and pulley bucket tipping.

An auxiliary support wheel 113 (FIG. 12) is mounted on the narrow side of bucket 110 in concentric rotating relation with the axis of spindle 67, as is shown in FIGS. 13 and 14. An auxiliary support track 115 is positioned inboard of chain track 51 and supports wheel 113, as is best shown in FIG. 14.

The support track 115 is tubular and parallels chain track 51. Bucket 110 is therefore supported on opposite sides and is able to carry substantially more weight without fear of damage to either the bucket 110 or the chain or chain track.

Figures 15, 16, 17, 18:
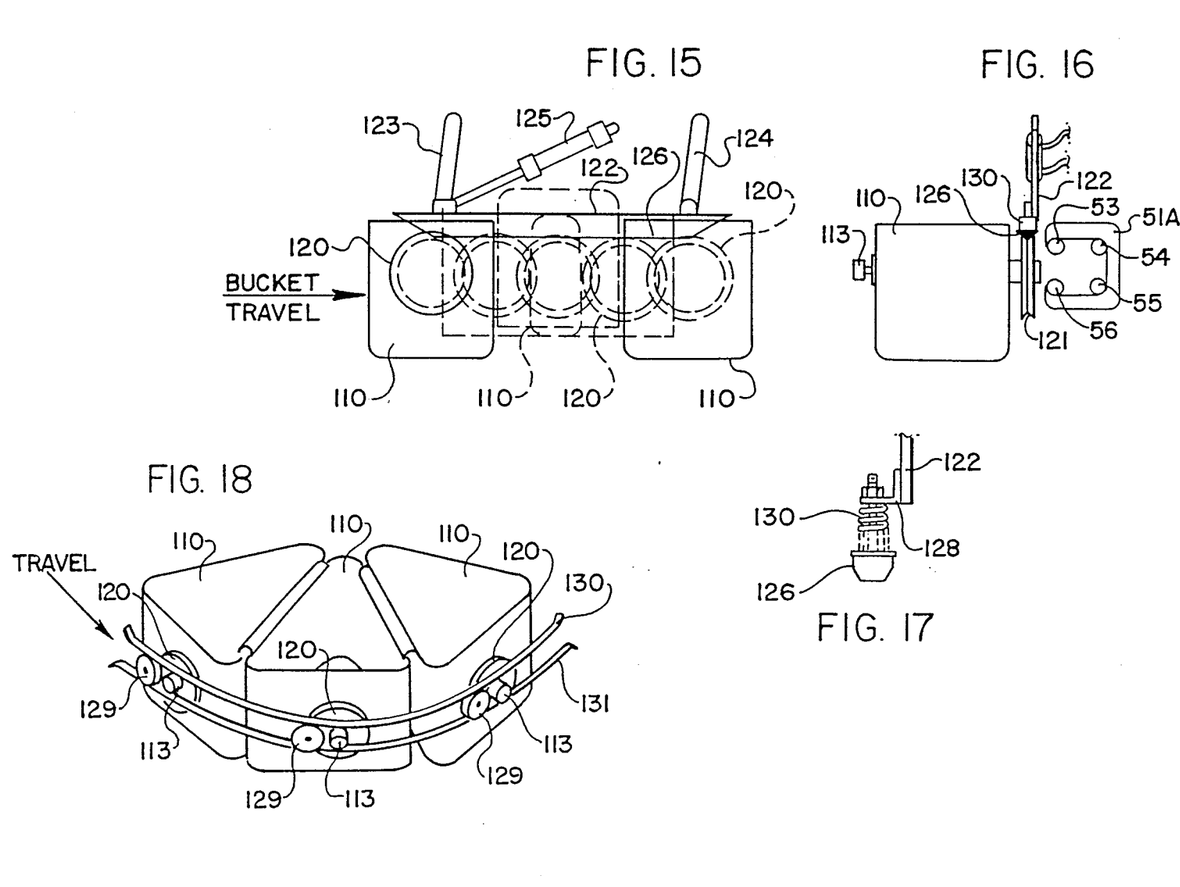
FIG. 15 is a side elevation of the rack and pulley bucket tipping apparatus.
FIG. 16 is a schematic end view of the apparatus shown in FIG. 15.
FIG. 17 is a fragmentary enlarged view of the mounting arrangement of the pulley-engaging strip shown in FIG. 16.
FIG. 18 is a perspective view of the bucket leveling bars according to an embodiment of the invention.

Referring now to FIGS. 15 and 16, another embodiment of a bucket emptying apparatus is shown. The apparatus can be used with either bucket 11 or 110 but will be described below with reference to bucket 110. The sprocket-type of emptying apparatus is unable to effectively control the bucket rotation at speeds greater than about 40 rpm. Therefore, a friction-type of emptying device permits positive control of the bucket or 110 throughout its entire 360 degree revolution. A pulley 120 is mounted concentrically with spindle 67 and is fixed to rotate with bucket 110 as it rotates.

Preferably, pulley 120 has a "V" groove 121 around its periphery.

A rack 122 is mounted by means of a pair of parallel pivot bars 123, 124 so that it can be moved into and out of operation when desired. Movement of the rack is effectuated by a hydraulic cylinder 125 or some other suitable means. The rack includes a spring-loaded elongate strip 126 which extends along the direction of travel of bucket 110. The strip 126 is preferably fabricated of rubber, neoprene or some other highly durable, heat resistant and friction creating substance. As is best shown in FIG. 17, strip 126 is mounted on rack 122 by means of an angle bracket 128 which carries a spring-loaded assembly 130. The cross-section of strip is essentially that of a truncated "V" and is sized to fit within the "V" groove of pulley 120. The spring-loading insures that good frictional, non-slip contact is achieved between pulley 120 and strip 126.

Referring again to FIG. 15, the sequence of operation is shown. As bucket 110 moves from left to right, strip 126 engages pulley 120. Friction between these two elements causes the pulley to rotate as the bucket continues to move. In so doing, the bucket is likewise caused to rotate, thereby emptying the contents. The strip 126 is the same length as the circumference of the pulley 120 so that when the downstream end of strip 126 has been reached, the pulley has rotated 360 degrees and the bucket 110 has reassumed its upright position.

As noted earlier, the buckets are filled when in a radius of a size which causes the buckets to move together whereby lips on the buckets are positioned relative to each other in overlapping relation in order to avoid spillage of the product being filled into the buckets. For this to happen, the buckets must be level with each other. This is accomplished by mounting a leveling wheel 129 on the pulley 120 eccentric to and trailing the axis of rotation of pulley 120, as is shown in FIG. 18. An upper guide bar 130 and a lower guide bar 131 are mounted in vertically spaced-apart relation at the filling location. As a bucket 110 moves into the filling position, leveling wheel 129 moves between the guide bars 130 and 131. The guide bars 130, 131 are flared apart slightly at their upstream opening to make sure that the leveling wheel is guided into position to make the transit. Of course, this arrangement can be used wherever bucket leveling is needed.

A bucket tipping apparatus for providing increased dwell for the bucket in an inverted emptying position is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. An apparatus for tipping a bucket carried by a conveyor chain around a circuit to empty the contents thereof at a predetermined location, said apparatus characterized by providing a dwell time to the bucket in its inverted position as the bucket is rotated 360 degrees around a fixed pivot degrees to permit complete emptying of the buckets, said apparatus comprising:
   (a) a sprocket mounted concentric with the pivot about which the bucket rotates and fixed for rotation with the bucket, said sprocket having a plurality of radially outwardly-extending uniformly spaced-apart projections and at least one space on said sprocket defined by the absence of a projection; and
   (b) an elongate rack positioned adjacent the chain at the bucket tipping position and having sprocket engaging means thereon positioned in engaging alignment with the projections of the sprocket as the bucket passes thereby to arrest rotation of the bucket while the bucket is in its inverted position to permit the contents to empty entirely.

2. An apparatus for tipping the contents from a bucket according to claim 1, wherein said sprocket has five projections thereon spaced 60 degrees of arc apart, and wherein said space on said sprocket defined by the absence of a projection comprises 120 degrees of arc.

3. An apparatus for tipping the contents from a bucket according to claim 2, wherein said sprocket engaging means comprise pins projecting outwardly from the rack into the path of travel of the sprocket, and a dwell space thereon between two of the pins in registration with the space on the sprocket defined by the absence of a projection.

4. An apparatus for tipping the contents from a bucket according to claim 3, and including an arresting block positioned in the dwell space on said rack for preventing rotation of the sprocket and the bucket.

5. An apparatus for tipping a bucket carried by a conveyor chain around a circuit to empty the contents thereof at a predetermined location, said apparatus characterized by providing a dwell time to the bucket in its inverted position as the bucket is rotated 360 degrees around a fixed pivot to permit complete emptying of the bucket, said apparatus comprising:
   (a) a sprocket mounted concentric with the pivot about which the bucket rotates and fixed for rotation with the bucket, said sprocket having five projections thereon spaced 60 degrees of arc apart and wherein said space on said sprocket defined by the absence of a projection comprises 120 degrees of arc; and
   (b) an elongate rack positioned adjacent the chain at the bucket tipping position and having sprocket engaging means thereon positioned in engaging alignment with the projections of the sprocket as the bucket passes thereby, said sprocket engaging means comprising pins projecting outwardly from the rack into the path of travel of the sprocket, and a dwell space thereon between two of the pins in registration with the space on the sprocket defined by the absence of a projection, and including means for cooperating with the space on the sprocket defined by the absence of the projection to arrest the rotation of the bucket while the bucket is in its inverted position to permit the contents to empty entirely.

* * * * *